(12) United States Patent
Martini et al.

(10) Patent No.: US 7,645,076 B2
(45) Date of Patent: Jan. 12, 2010

(54) COUPLING STRUCTURE FOR OPTICAL FIBRES AND PROCESS FOR MAKING IT

(75) Inventors: Francesco Martini, Cornaredo (IT); Pietro Montanini, Cornaredo (IT); Guido Oliveti, Milan (IT); Alberto Rampulla, Milan (IT); Giacomo Rossi, Milan (IT)

(73) Assignees: Pirelli & C. S.p.A., Milan (IT); ST Microelectronics NV, Amsterdam (NL)

( * ) Notice: Subject to any disclaimer, the term of this patent is extended or adjusted under 35 U.S.C. 154(b) by 172 days.

(21) Appl. No.: 10/554,618

(22) PCT Filed: Apr. 29, 2003

(86) PCT No.: PCT/EP03/04473

§ 371 (c)(1),
(2), (4) Date: Jul. 24, 2006

(87) PCT Pub. No.: WO2004/097486

PCT Pub. Date: Nov. 11, 2004

(65) Prior Publication Data

US 2009/0136237 A1 May 28, 2009

(51) Int. Cl.
*G02B 6/36* (2006.01)
*H01L 21/00* (2006.01)

(52) U.S. Cl. .............................. 385/88; 385/52; 385/92; 385/141; 438/31

(58) Field of Classification Search .................... 385/39, 385/43, 52, 53, 88, 89, 93, 94, 139, 49, 130, 385/131, 132, 141; 438/26, 27, 28, 29, 31; 398/141; 257/E21.001

See application file for complete search history.

(56) References Cited

U.S. PATENT DOCUMENTS

| 4,199,222 | A | 4/1980 | Ikushima et al. ........... 385/88 X |
| 5,247,597 | A | 9/1993 | Blacha et al. .................. 385/88 |
| 5,281,305 | A | 1/1994 | Lee et al. ..................... 156/657 |
| 5,357,590 | A | 10/1994 | Auracher ...................... 385/33 |

(Continued)

FOREIGN PATENT DOCUMENTS

EP   0 903 602 A2   3/1999   ............... 385/88 X (Continued)

*Primary Examiner*—Brian M Healy
(74) *Attorney, Agent, or Firm*—Finnegan, Henderson, Farabow, Garrett & Dunner, L.L.P.

(57) ABSTRACT

A coupling structure for coupling optical radiation, i.e., light, between an optical fibre and an optical device, e.g., a laser diode or a photodiode. The coupling structure has an optical through-via which guides the optical radiation to or from the optical fibre. Light exiting the fibre travels through a guidance channel so it remains substantially confined to a narrow optical path that mimics the fibre core. Conversely, light enters the fibre after having traveled through the guidance channel. The guidance channel has a first core region, the "channel core", having first refractive index surrounded by a second region, the "channel cladding" having a second refractive index smaller than the first refractive index. The coupling structure, including the guidance channel, is preferably made of semiconductor-based material, more preferably of silicon-based material. The guidance channel is preferably silicon oxide. The coupling structure further has a fibre drive-in element, which facilitates insertion and alignment of the optical fibre to the guidance channel.

42 Claims, 17 Drawing Sheets

U.S. PATENT DOCUMENTS

| | | | | |
|---|---|---|---|---|
| 5,499,732 A * | 3/1996 | Nishimoto | ..................... | 438/25 |
| 5,631,987 A | 5/1997 | Lasky et al. | ..................... | 385/88 |
| 5,687,270 A | 11/1997 | Takizawa | ..................... | 385/94 |
| 6,328,482 B1 | 12/2001 | Jian | ..................... | 385/88 |
| 6,491,443 B1 | 12/2002 | Serizawa et al. | ............... | 385/61 |
| 6,550,982 B2 * | 4/2003 | Auburger et al. | ............... | 385/88 |
| 6,785,033 B2 * | 8/2004 | Meyers et al. | ................ | 359/237 |
| 7,471,866 B2 * | 12/2008 | Dumais et al. | ............... | 385/132 |
| 2002/0031306 A1 | 3/2002 | Ambrosy et al. | ................ | 385/49 |
| 2002/0076170 A1 | 6/2002 | Murali et al. | .................. | 385/88 |
| 2009/0136237 A1 * | 5/2009 | Martini et al. | ............... | 398/141 |

FOREIGN PATENT DOCUMENTS

WO    WO 01/35140 A1    5/2001    ............... 385/88 X

\* cited by examiner

COUPLING STRUCTURE FOR OPTICAL FIBRES AND PROCESS FOR MAKING IT

The present invention relates to a coupling structure for optical fibres. In particular, the invention relates to a coupling structure suitable for passive alignment of an optical fibre to an optical device, or a plurality of optical fibres to a plurality of optical devices, and its related fabrication method. In addition, the invention concerns an opto-electronic package for connection and alignment of optical fibres.

RELATED ART

The demand of high-speed data access and the associated need of more bandwidth for applications such as Internet or Ethernet have recently increased the interest towards the distribution of high-capacity optical fibres directly to customer premises, bringing fibre optics to the so-called "last mile". Implementation of complete fiber optic networks from a service provider directly to subscriber's premises, such as fibre to the business/home, often generally referred to as fibre-to-the-X (FTTX), is presently still considerably expensive. In order to extend the use of FTTX, fibre optical components must decline in price.

Packaging of transmitter or receiver components largely contributes to the cost of optical network units (ONU), which are installed at the end of the fibre optic network, i.e., at the customer's premises. In the packaging steps, an important issue for achieving low-cost and compact-size modules is the simplification or automation of optical alignment procedures between optical devices and optical fibres, while ensuring reliability and accuracy in the alignment. Passive alignment techniques are often preferred to active alignment methods, which are labour intensive and require expensive equipment.

The efficiency of signal transmission of the optical fibre is significantly affected by the accuracy in transferring the light between the optical fibre and the optical device, such as a laser diode or a photodiode. General alignment tolerances may depend on the fibre type, e.g., single-mode (SM) or multi-mode (MM), or on the optical device. For single mode fibres to laser alignment sub-micron tolerances are normally required. Typical laser emitting regions are 2-3 μm and single mode fibre cores are generally less than 10 μm, requiring the two to be positioned to better than 1 μm accuracy. Alignment tolerances for photodiodes are generally less stringent than those for laser diodes.

Silicon technology is a promising approach for making alignment tolerant structures that can be used for passive alignment of optical fibres to optical devices.

A silicon alignment chip having via holes in which the fibres are pre-aligned is described in U.S. Pat. No. 5,247,597. The fibres are automatically aligned by solder bonding the alignment chip on a substrate with surface emitting or receiving elements.

Applicants have observed that an alignment chip having via holes in which the fibres are inserted does not allow the devices to be hermetically sealed inside a package in order to prevent dust and condensation to damage the devices.

U.S. Pat. No. 6,328,482 describes a multilayer optical fibre coupler for coupling light between an optical device, such as a vertically-aligned surface-emitting laser (VCSEL) or a photodiode, and an optical fibre. The multilayer coupler includes a first layer having a fibre socket formed by photolithographic masking and etching, which extends through said first layer, and a second layer bonded to the first layer. The optical fibre is affixed into the fibre socket with epoxy.

Applicants have observed that the presence of the second layer interposed between the optical fibre and the optoelectronic device can affect the precision of the alignment, as light exiting or entering the optical fibre experiences diffusion and/or diffraction by passing the material of the second layer. This will influence the efficiency of the optical coupling, in particular for opto-electronic devices having an emitting or receiving area of size comparable to or less than that of the fibre core.

U.S. Pat. No. 5,631,897 discloses a laser optical subassembly in a receptacle form, with an annulus having a light conductor. A plug for an optical fibre is bottomed against the annulus.

SUMMARY OF THE INVENTION

Applicants have understood that, in order to optimise the coupling efficiency between an optical device and an optical fibre, the space interposed between the fiber end and the active region of the optical device where the light travels without being guided, i.e., through an unguided medium, should be minimised in order to limit diffusion or diffraction.

Optical devices are often housed in a package or in a chip carrier, such as a transmitter, receiver or a transceiver module, and their electrical connections to the bonding pads of the package or chip carrier are typically made by wire bonding techniques. In this case, a minimum longitudinal distance can be required, which can be typically of 50-70 μm, between the optical device and other elements, e.g., a package lid or a coupler for the optical coupling of the fibre to the device. For example, a wire bond is required to make a top contact to commercially available vertical-cavity surface-emitting laser (VCSEL), imposing a certain amount of clearance around the VCSEL. Because of the space required for the wire bond, in case of coupling of the optical device to an optical fibre, the optical fibre end surface cannot be brought sufficiently close to the optical device to make a low-loss optical connection.

It is an object of the present invention to provide a packaging arrangement for a low-cost highly integrated opto-electronic module, which would promote precise and relatively easy fibre-to-optical device insertion and alignment.

It is to be noted that optical coupling between optical fibres and optical devices that are flip-chip bonded to the coupling structure also benefit from the present invention, as the thickness of the unguided media where the light travels when exiting the optical device or the optical fibre is reduced to the minimum.

Applicants have developed a new coupling structure for coupling optical radiation, i.e., light, between an optical fibre and an optical device, said coupling structure comprising an optical through-via which guides the light to or from the optical fibre. According to the invention, light exiting the fibre travels through a guided channel so as it remains substantially confined to a narrow optical path that mimics the optical confinement in the fibre. Conversely, light enters the fibre after having traveled through the guided channel, hereinafter referred to as the guidance channel. According to the preferred embodiments, the guidance channel comprises a first core region, the "channel core", having first refractive index surrounded by a second region, the "channel cladding", having a second refractive index smaller than the first refractive index. The coupling structure including the guidance channel is preferably made of semiconductor-based material, more preferably of silicon-based material.

Applicants have further developed a coupling structure comprising a guidance element including a guidance channel, which is integrated to a fibre drive-in element that allows the insertion of the optical fibre. Precise alignment of the optical device to the fibre can be achieved by fabricating the coupling structure with high precision, i.e., of less than 1 μm, and by the accurate placement of the drive-in element to the guidance element so as to align the guidance channel with the fibre, in particular the guidance channel core with the fibre core.

According to one aspect of the present invention, the invention relates to a coupling structure for optical coupling between an optical fibre and an optical device comprising a first substrate having a front main surface;
at least a guidance channel which extends through said first substrate from the front main surface to an opposite rear main surface,
said guidance channel being configured so as to optically confine the light propagating therethrough, and
a second substrate in which a via hole for insertion of the optical fibre is formed such that the via hole goes through said second substrate from a front main surface to an opposite rear main surface of said second substrate, said second substrate being placed on the first substrate with its opposite rear main surface adjacent to the first main surface of the first substrate so that the via hole of the second substrate is substantially in alignment with the guidance channel of the first substrate.

According to the preferred embodiment of the invention, the guidance channel comprises an internal optically transparent region having a first refractive index and defining a guide channel core and an external optically transparent region surrounding the internal optically transparent region and defining a guide channel cladding, the external optically transparent region having a second refractive index smaller than the first refractive index of the internal optically transparent region.

Preferably, the first substrate of the coupling structure comprising the guidance channel is made of semiconductor material, more preferably of silicon. Preferably, the guidance channel comprises silicon oxide ($SiO_2$). According to an embodiment of the invention, guide channel core and guide channel cladding are made of $SiO_2$-based material, wherein the refractive index of the $SiO_2$ material making the guide channel core has a relative difference within the range 0.5-0.8% from the refractive index of the $SiO_2$-based material of the guide channel cladding. We note that in this context for $SiO_2$-based material or $SiO_2$, when not further specified, we refer to a material that substantially comprises silicon oxide, e.g., doped or undoped $SiO_2$.

The coupling structure of the invention functions also as mechanical stop for the fibre. In a preferred embodiment, the coupling structure functions in addition as a closure member, e.g., a lid, for a package or a chip carrier that houses at least an optical device.

According to one of its aspects, the invention relates to an optical package comprising a housing having a cavity and an aperture;
at least an optical device fixed in the cavity of the housing and optically aligned with the aperture;
a coupling structure for coupling of an optical fibre to the optical device, which is capable of closing the aperture of the housing, wherein said coupling structure comprises
a first substrate having a front main surface;
at least a guidance channel which extends through said first substrate from the front main surface to an opposite rear main surface, wherein said guidance channel is configured so as to optically confine the light propagating therethrough, and
a second substrate in which a via hole for insertion of the optical fibre is formed such that the via hole goes through said second substrate from a front main surface to an opposite rear main surface of said second substrate, said second substrate being placed on the first substrate with its opposite rear main surface adjacent to the first main surface of the first substrate so that the via hole of the second substrate is substantially in alignment with the guidance channel of the first substrate.

According to a further aspect, the invention relates to a method of manufacturing a semiconductor coupling structure, the method comprising the successive steps of:

providing a first semiconductor substrate having opposite front and rear surfaces;
etching to form a substantially vertical trench from the front surface in the first semiconductor substrate;
forming a first layer of silicon oxide material on the inner walls of the trench and on the upper surface of said substrate near the said trench, said first silicon oxide layer having a first refractive index;
forming a second layer of silicon oxide material over said first layer so as to fill the trench, said second silicon oxide layer having a second refractive index larger than the first refractive index of the first silicon oxide layer;
planarising the second silicon oxide layer to expose the first silicon oxide layer in the trench and to form a planar surface, and
back etching said first semiconductor substrate from the rear surface to expose the first and the second silicon oxide layers.

Preferably, the method further comprises the steps of:
providing a second semiconductor substrate having opposite front and rear surfaces;
etching a first substantially vertical trench from the front surface of the second semiconductor substrate to a first depth;
forming a first layer of silicon oxide material on the inner walls of the trench and on the front surface of said second substrate;
etching a second trench with tapered side walls from the rear surface of the second substrate to the depth so that the bottom of the second trench is in contact with the first layer of silicon oxide material in the inner walls of the first trench;
removing the silicon oxide layer from the bottom of the second trench and the inner walls of the first trench to form a funnel-shaped via hole extending from the front surface to the rear surface of the second substrate;
disposing the front surface of the second semiconductor substrate against the main surface of the first semiconductor substrate such that the funnel-shaped via hole of the second substrate is substantially in alignment with the guidance channel of the first substrate, and
bonding said substrates together.

BRIEF DESCRIPTION OF THE DRAWINGS

The foregoing advantages of the present invention will be appreciated more fully from the following description, with reference to the accompanying drawings in which.

DETAILED DESCRIPTION

First Embodiment

Figure 1:
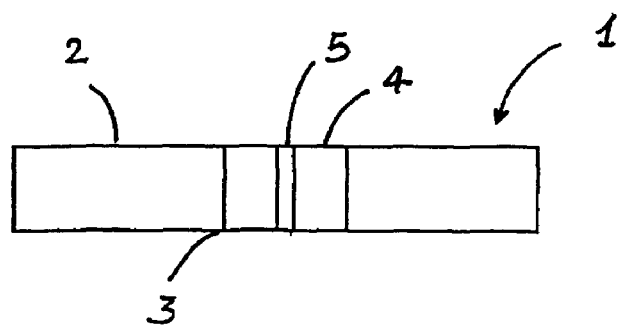
FIG. 1 shows the coupling structure according to a first embodiment of the present invention.

FIG. 1 illustrates a first preferred embodiment of the coupling structure for coupling an optical fibre to an optical device according to the present invention. Coupling structure, the guidance element 1, comprises a monocrystalline silicon (c-Si) substrate 2 having formed therein a $SiO_2$-based optical through-via 3, or guidance channel, which includes a channel cladding 4 and a channel core 5. In the preferred embodiment, the channel core 5 is substantially made of $SiO_2$ having a refractive index larger than the refractive index of the $SiO_2$ which substantially forms the channel cladding 4. Preferably, the difference in refractive index between the core and the dad channels is of 0.5-0.8%. As it will become clear from the following description, the optical fibre will be coupled to the guidance channel of the guidance element 1 so that the core of the fibre will substantially correspond to the channel core of the guidance channel. Light transmitted from or to the optical fibre will be guided through the channel core of the guidance channel, which behaves substantially as an optical fibre.

Figure 2A:
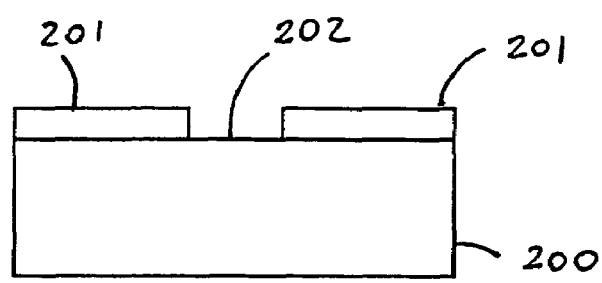
FIGS. 2A through 2F schematically illustrate in cross-sectional representation the process steps to obtain the coupling structure according to the first embodiment of the invention.
Figure 2B:
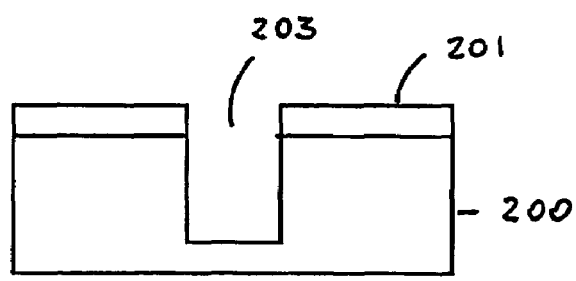
Figure 2C:
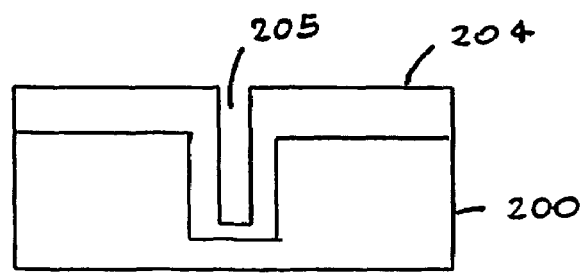

An example of the process steps that can be used to obtain the guidance element of FIG. 1 is shown in FIGS. 2A-2F. A silicon oxide layer 201 as etching stopper is grown on a substrate 200 comprising c-Si with a thickness of 100-700 μm, for example a 6-inch 675 μm-thick wafer. The oxide layer 201 is lithographically patterned and then etched by a dry or a wet process in order to define opening 202 in oxide layer 201 (FIG. 2A). Opening 202 corresponds to the location of the guidance channel. If the application requires more guidance channels, e.g., for the coupling of more fibres, more openings can be formed in the oxide layer. In a preferred embodiment, opening 202 is circular with a diameter of about twice the diameter of the desired channel core. For example, an opening of about 20-μm diameter can be chosen to obtain a channel core of 8-10 μm diameter. The silicon is etched, e.g., by dry etching, through the opening in order to form a trench 203 (FIG. 2B). The depth of trench 203 is selected in dependence of the initial thickness of the substrate 200 or on the particular application of the coupling structure. For example, the trench depth can be of 100-200 μm. The oxide layer 201 is then removed, e.g., by standard dipped chemical etching, and a relatively thick $SiO_2$ layer 204 is grown on the substrate surface, for example by thermal oxidation or by plasma-enhanced chemical vapour deposition (PECVD) deposition (FIG. 2C). For a given initial trench diameter (in case of circular opening), the thickness of the $SiO_2$ layer 204 defines the annular width of the channel cladding to be formed (denoted with 4 in FIG. 1) and opening 205 in the trench defines the diameter of the channel core (reference numeral 5 in FIG. 1). Preferably, the width of the channel cladding is comprised between 10 and 30 μm, more preferably between 12 and 18 μm.

Figure 2D:
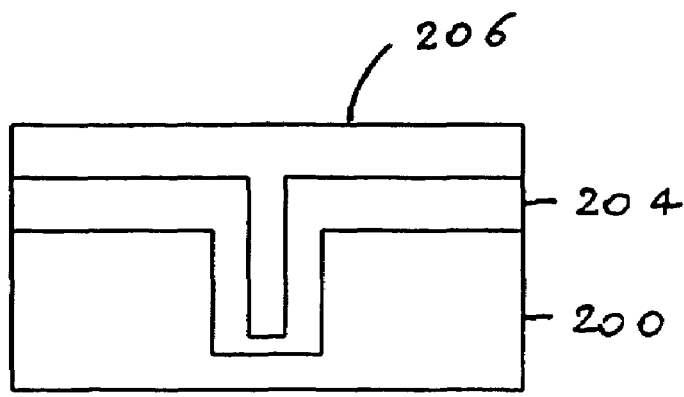
Figure 2E:
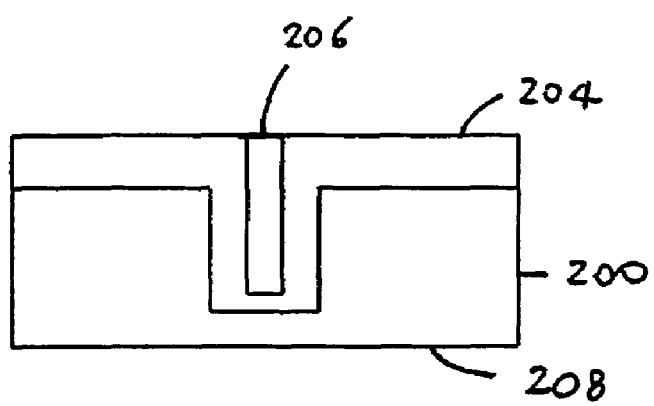
Figure 2F:
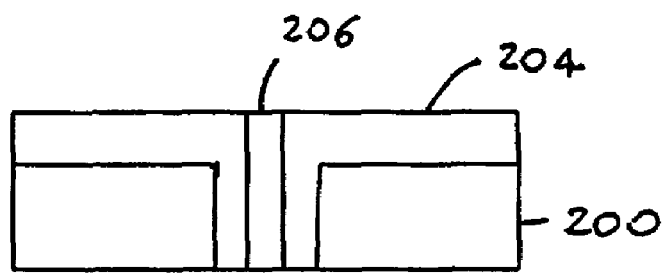

In a subsequent step, trench 205 is filled through depositing a $SiO_2$ layer 206 over $SiO_2$ layer 204 (FIG. 2D). $SiO_2$ layer 206 has a refractive index $n_2$ larger than the refractive index $n_1$ of layer 204. In a preferred embodiment, to form layer 204, 15 μm of undoped silica glass (USG) having a refractive index $n_1$=1.457 is grown by thermal oxidation at T=1200° C. for 168 hours. Preferably, layer 206 is a P-doped $SiO_2$ (PSG) with $n_2$=1.460, which is deposited by low pressure chemical vapour deposition (LPCVD) at 700° C. while keeping the pressure at 400 mTorr. The surface oxide layer 206 is planarised through chemical-mechanical polishing (CMP) such that layer 206 is left only inside the trench (FIG. 2E) in order to form an elongated region. This process step has the double function of exposing the channel core surface and of planarising/polishing the channel surface so as to improve optical coupling. Optionally, oxide removal by CMP proceeds up to the exposure of the silicon surface to leave the $SiO_2$ layer 204 only in the channel. Known endpoint detection methodologies that can differentiate polishing between oxide and silicon could be used to determine when the proper thickness of material has been removed. Finally, backside surface 208 of the silicon substrate is grinded so as to expose the guidance channel (FIG. 2F) and subsequently polished by CMP to smooth the surface.

Alternatively to the process described in FIGS. 2A-2F, a through-hole can be etched in the silicon substrate, although this is a less preferred embodiment in case of final substrate thickness of less than about 250 μm. It will be understood that other obvious modifications of the fabrication process described in the present embodiment will not depart from the scope of the invention. Although silicon substrate is preferably monocrystalline, polycrystalline or multicrystalline silicon substrates can be used. Generally, other substrate materials can be selected as long as process compatibility with the silicon oxide is ensured, e.g., to withstand relatively high temperatures of about 1000-1200° C.

Second Embodiment

Figure 3A:
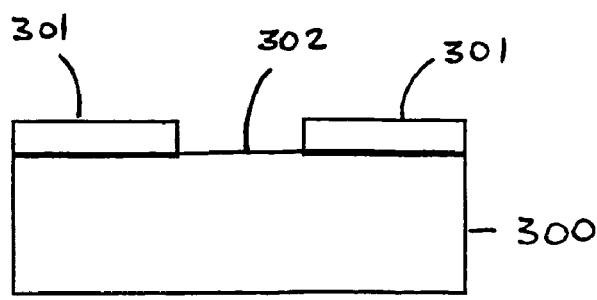
FIGS. 3A through 3H are cross-sectional views showing the process steps of a second embodiment of the invention.
Figure 3B:
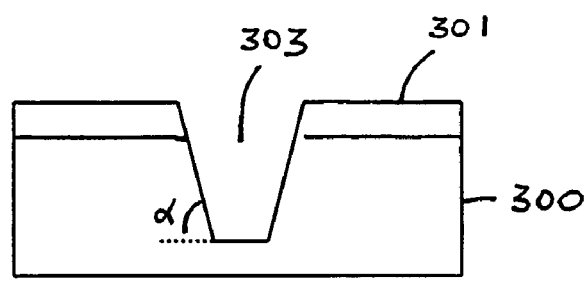
Figure 3C:
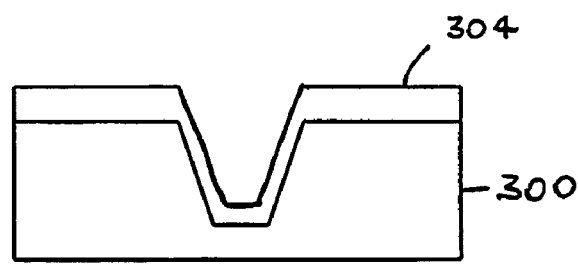
Figure 3D:
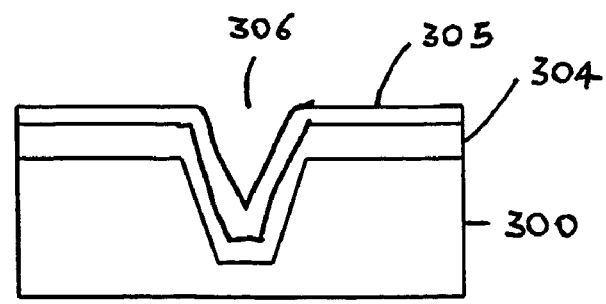
Figure 3E:
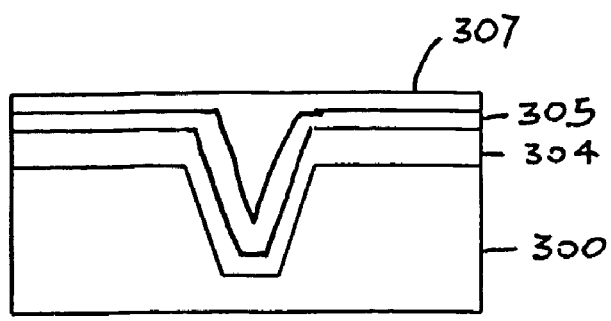
Figure 3F:
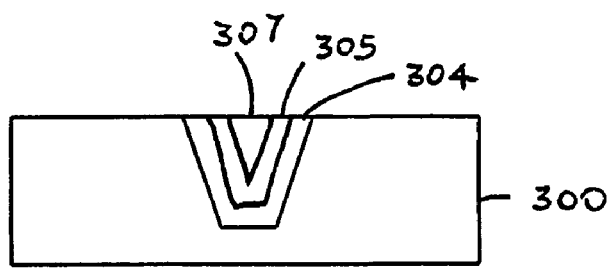
Figure 3G:
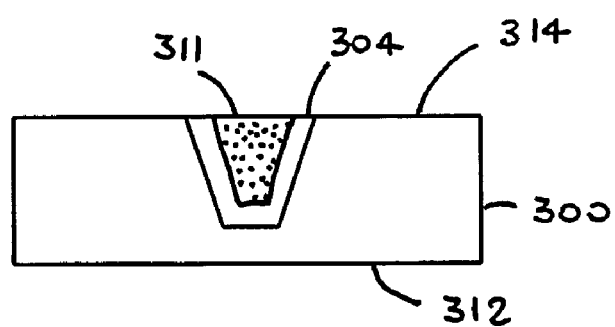

According to a second embodiment of the present invention, the coupling structure comprises a graded-index guidance channel. FIGS. 3A-3H illustrate the process steps that can be used to obtain the coupling structure with a graded-index channel shown in FIG. 3H. An opening 302 is defined in a silicon oxide mask 301 on a silicon substrate 300 (FIG. 3A). The silicon substrate is for example a 6" c-Si 675 μm-thick wafer. Preferably, opening 302 is circular and has a diameter about twice the diameter of the desired channel core of the coupling structure. For example, in order to obtain a 9-μm channel core diameter, opening 302 is chosen to be about 18 μm. A deep trench 303 is formed in the silicon substrate 300 through opening 302 by etching, preferably by dry etching (FIG. 3B). Preferably, trench 303 has "sloped" sidewalls. For example, deep reactive ion etching (RIE) is carried out at a temperature of 20° C. for 1 h to form a 200 μm deep trench having a wall taper angle α of 87-88° with a precision of 1 degree. After having removed the oxide mask 301, a relatively thick $SiO_2$ layer 304 is formed on the silicon surface (FIG. 3C), preferably by thermal oxidation. The suitable $SiO_2$ thickness depends on the initial trench width and on the desired channel core width. Preferably, the thickness of SiO₂ layer 304 is not smaller than 10 μm. A second SiO₂ layer 305 is then deposited on layer 304 (FIG. 3D), for example by LPCVD or by PECVD. The SiO₂ layer 305 has a refractive index $n_2$ larger than the refractive index $n_1$ of layer 304. At this step, a trench 306 of reduced opening width remains. A third SiO₂ layer 307 with refractive index $n_3 > n_2$ is deposited on layer 305 at a thickness suitable to at least fill the opening in trench 306 (FIG. 3E). Layers 305 and 306 are made of doped SiO₂ having different doping concentrations or different doping elements. The oxide surface layers are removed by CMP in order to expose all the three SiO₂ layers with different refractive indices and to polish the surface to improve optical coupling (FIG. 3F). Subsequently, the substrate is annealed so as to promote mutual diffusion of dopants between SiO₂ layers 305 and 307 in order to obtain a final SiO₂ layer 311 having a refraction index that gradually varies with the depth of the guidance channel (FIG. 3G) because of the sloped lateral shape of the channel. The refraction index of filled trench 311 at its upper surface is approximately equal to $n_2$, to increase to a value approximately corresponding to $n_3$ at the deepest surface 313 of the guidance element. Variation of the refraction index is present also in the radial direction, with inner channel radial region, i.e. close to the channel centre, having a refractive index larger than that of the outer channel radial region, that is itself closer to the oxide layer 304. For example, layer 304 is USG with $n_1 = 1.457$, layer 305 is PSG with $n_2 = 1.465$, and layer 307 is PSG with $n_3 = 1.468$. Both PSG layers are made by LPCVD at T=700° C. under a pressure of 400 mTorr, but they differ in their phosphorous content. Annealing is carried out at T=1000-1100° C., resulting in the inter-diffusion of phosphorous between the two PSG layers having a refractive index radially grading from $n_2$ to $n_3$ and, in case of sloped sidewalls, vertically grading from the upper surface to the bottom surface of the channel. During annealing at those temperatures, USG layer 304 is substantially not influenced because of its higher fusion temperature with respect to the doped oxide regions. Annealing conditions and geometry of the channel walls will determine, together with the initial doping of layers 305 and 307, the final refractive index profile.

Figure 3H:
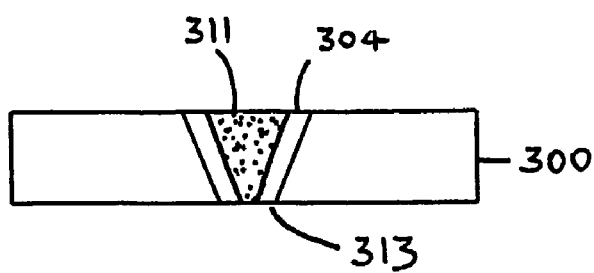

Finally, the backside surface 312 of the silicon substrate is grinded to expose the guidance channel 313 and subsequently polished to obtain an optically smooth surface (FIG. 3H).

A graded-index guidance channel acts as a grin lens and can be used to optimise the collimation of the beam exiting or entering the optical fibre. The optical device should be preferably placed at the focal distance of the graded lens. Considering the step-index refractive index profiles typical for the current technology, the focal distance can be relatively large, of the order of 1.0-1.5 mm, for guidance channels lengths of 200-300 μm.

Third Embodiment

Figure 4A:
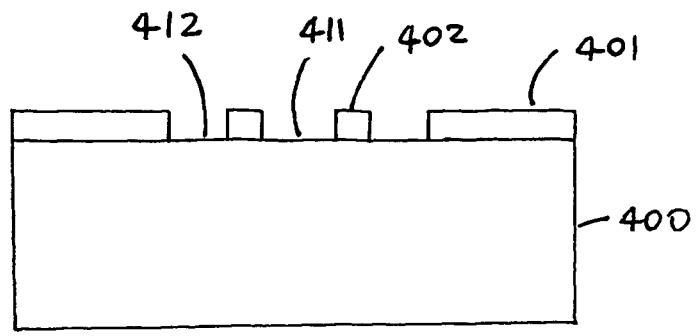
FIGS. 4A through 4G are cross-sectional views showing the process steps of a third embodiment of the invention.
Figure 4B:
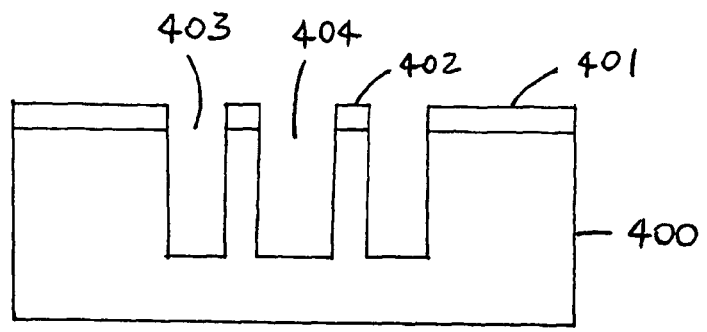
Figure 4C:
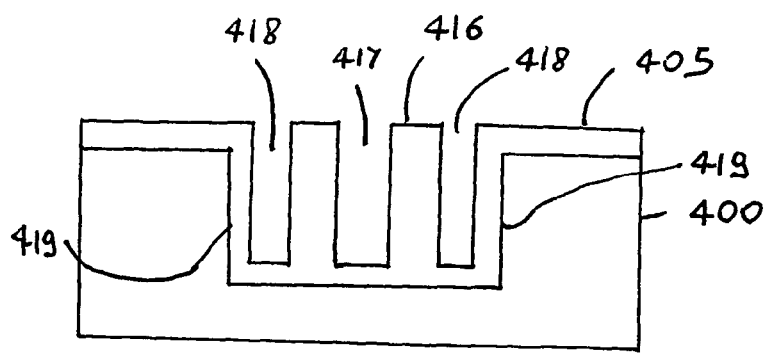

According to a third embodiment of the present invention, the coupling structure comprises a coaxial guidance channel. A silicon oxide layer is grown on a c-Si substrate 400. The silicon oxide 401 is patterned by means of a lithographic mask so as to expose the areas where the trenches are to be formed (FIG. 4A). A non-exposed annular surface 402 is interposed between a first circular opening 411 and an external annular opening 412. The exposed areas are then etched, e.g., by dry etching, to form deep trenches 403 and 404 (FIG. 4B). In a preferred embodiment, trench 404 has a diameter of about 18 μm and external annular trench 403 has a width of about 15 μm. The annular region underneath the non-etched annular surface 402 is preferably 7 μm wide. The oxide 401 is then removed. In a subsequent step, a relatively thick SiO₂ layer 405 of refractive index $n_1$ is thermally grown on the substrate surface and within the trenches so as to fully oxidise the annular wall corresponding to the non-etched annular area 416 (FIG. 4C). Preferably, SiO₂ layer 405 has a thickness of about 10 μm on the planar top surface, the annular wall 416 is 14 μm wide, the central trench region 417 has a diameter of 10 μm, and the external annular trench 418 has a width of 6 μm. Annular wall 416 and edge portions 419 of external annular trench 418 will serve as cladding regions for light propagation.

Figure 4D:
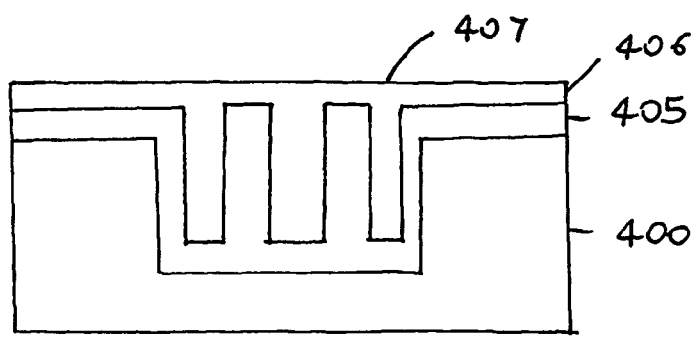

Trenches 417 and 418 are filled through deposition of a SiO₂ layer 406, e.g., by LPCVC, having a refractive index $n_2 > n_1$ (FIG. 4D).

Figure 4E:
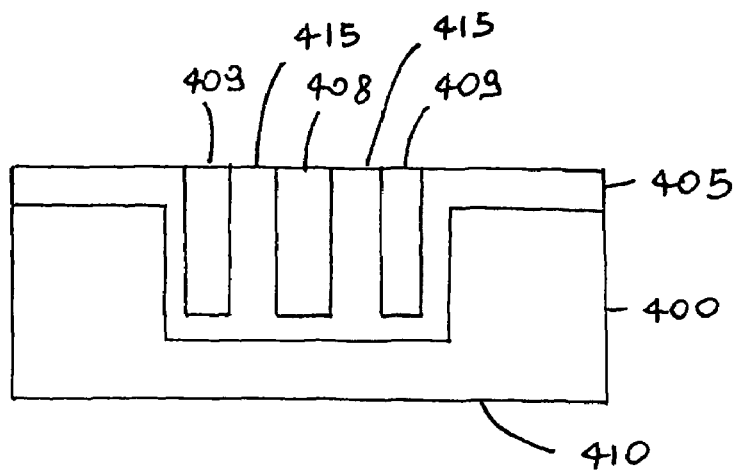

The structure is then planarised (e.g., using CMP) so as to polish the SiO₂ overlayer 407 at least down to the surface of layer 405 (FIG. 4E). The upper surface of the resulting structure comprises a central circular region 408 of refractive index $n_2$ surrounded by a first annular region 415 of index $n_1$, a second annular region 409 of index $n_2$, and a third region 405 of index $n_1$, which may cover substantially the remaining upper surface. Planar top view of the resulting structure is illustrated in FIG. 4G.

Figure 4F:
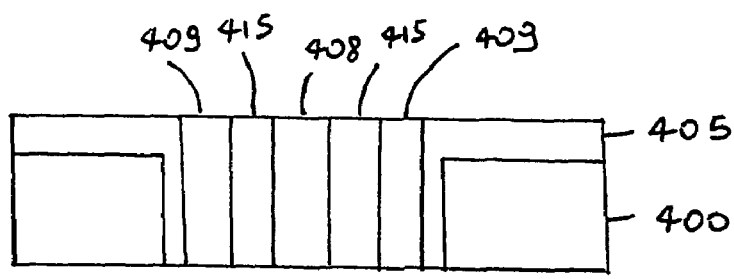
Figure 4G:
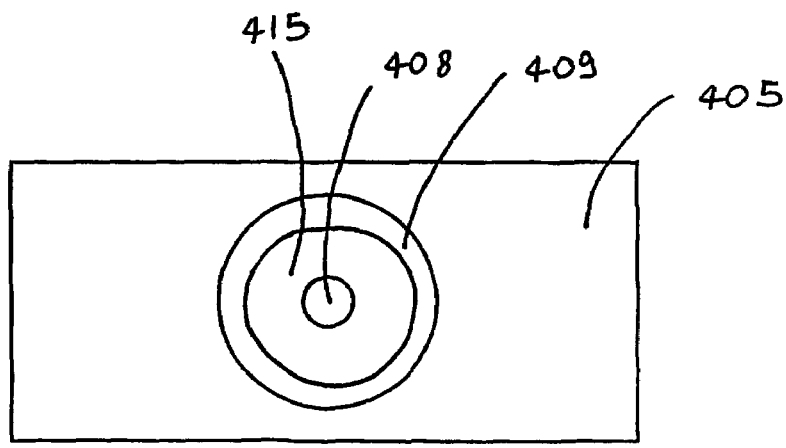

Finally, backside surface 410 of the silicon substrate is grinded so as to expose the co-axial guidance channel and subsequently polished to improve optical coupling (FIG. 4F).

Fourth Embodiment

The process described in the present embodiment is the formation of a structure comprising at least a guidance channel including a channel core and a channel cladding, said process being optimised to improve productivity by decreasing the required manufacturing time.

Figure 5A:
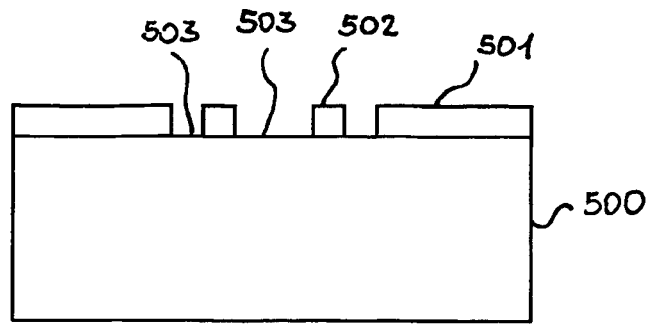
FIGS. 5A through 5G are cross-sectional views showing the process steps of a fourth embodiment of the invention.
Figure 5B:
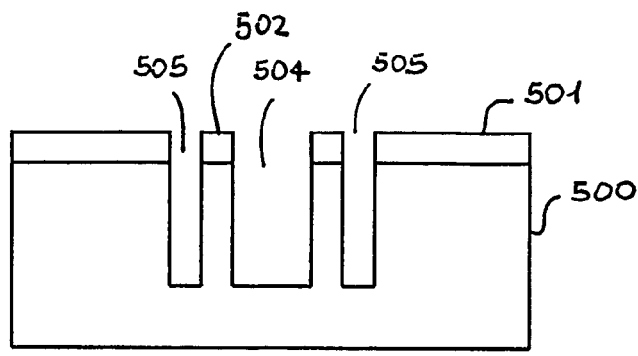
Figure 5C:
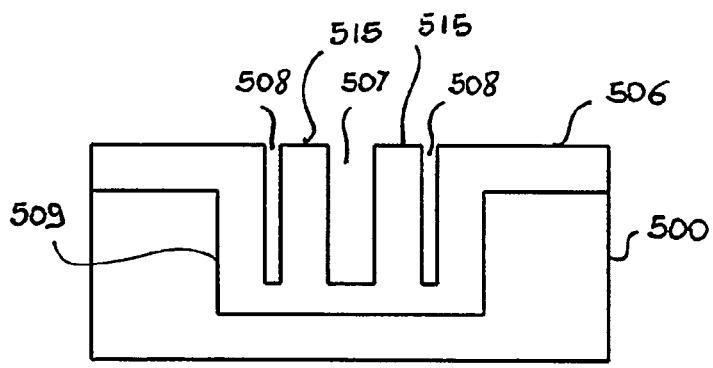
Figure 5D:
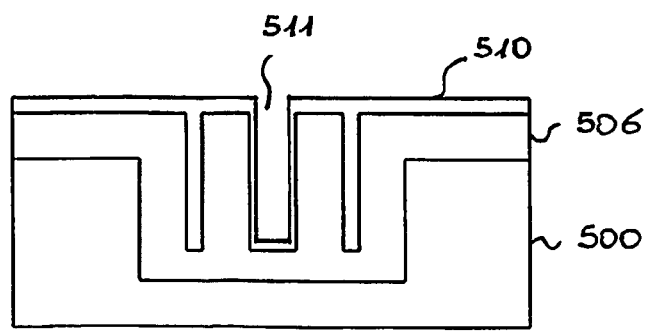
Figure 5E:
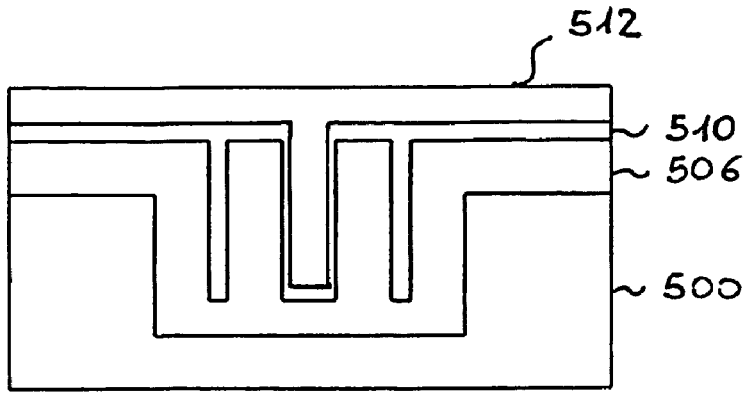

A thermal silicon oxide layer 501 is grown on a silicon substrate 500 and afterwards patterned using conventional photolithographic techniques to serve as a mask layer defining regions 503 to be etched (FIG. 5A). The exposed regions are then etched, e.g., by plasma etching, to a defined depth into the silicon substrate so as to form a central trench 504 and an annular external trench 505 (FIG. 5B). Oxide layer 501 is subsequently removed and a SiO₂ layer 506 is grown on the substrate top surface so as to fully oxidise the annular wall 515 (FIG. 5C). The width of the external annular trench 508 and that of the central trench 507 are reduced due to partial filling of the trench with the SiO₂ layer. In a subsequent step, a SiO₂ layer 510 with refractive index $n_1$ as that of layer 506 is deposited to a thickness so as to fill the external annular trench 508 and leave a residual central trench 511 (FIG. 5D). SiO₂ layers 506 and 510, having both a refractive index $n_1$, will serve as barrier layer for light propagation, i.e., the channel cladding. The diameter of the central trench 511 defines the diameter of the channel core. A SiO₂ layer 512 with $n_2 > n_1$ is then deposited on layer 510 to at least fill the central trench (FIG. 5E).

Figure 5F:
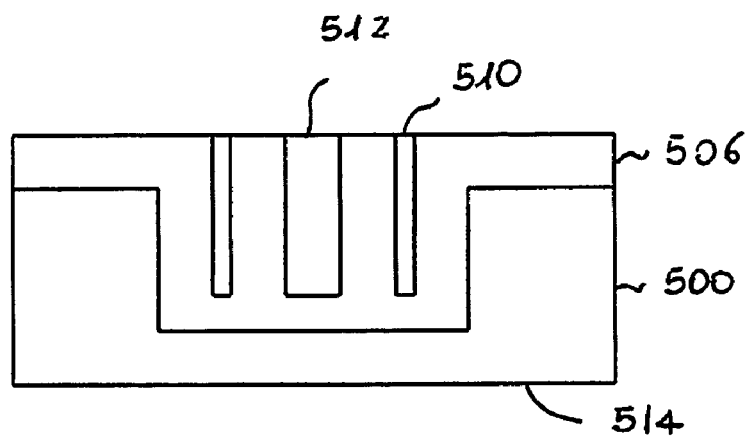
Figure 5G:
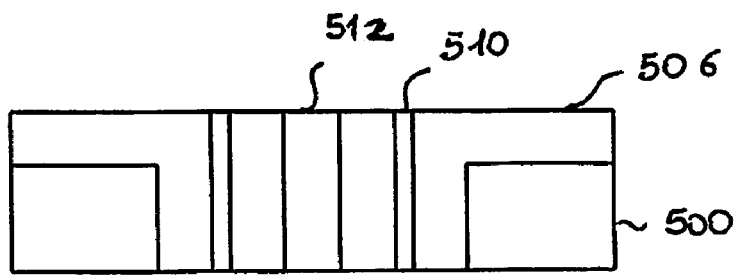

The SiO₂ layer 512 is then polished down at least to the upper surface of the SiO₂ layer 510 such as to expose SiO₂ layers 512 and 506 (FIG. 5F). Finally, the backside surface 514 of substrate 500 is grinded and polished to expose the guidance channel (FIG. 5G).

In a preferred embodiment, for coupling of a SM optical fibre, SiO₂ layer 512 is PSG and SiO₂ layers 506 and 510 are USG. The diameter of the central trench 504 is of 18 μm, the width of the external annular trench 505 of 9 μm, and the width of the non-etched regions 502 of 7 μm. Oxide layer 506 is grown to a preferred thickness of about 8 μm; the width of the external annular trench 508 is reduced to a width of about 1.5 µm and the diameter of the central trench 507 is reduced to a preferred value of 11 µm. The width of the non-etched annular region 515 is of 14 µm.

In a preferred embodiment, the diameter of the central trench 504 is of (9+A) µm, where A is the ideal core diameter of the fibre to be coupled to the optical device, e.g., 8-10 µm for SM fibres. Let's indicate with B the diameter of the annular section that will form the guidance channel cladding and with C the annular width of non-etched region between the central trench and the external annular trench (indicated with numeral 502 in FIG. 5B) as defined in the mask layer. The thickness of the silicon oxide to be grown on the substrate surface and on the side walls of the trenches (i.e., layer 506 in FIG. 5C) can be set to C/2, while the thickness of the layer filling the external annular trench (i.e., layer 510 in FIG. 5D) can be set to about 1 µm. Therefore, the diameter of the final channel cladding B is given by $$B=(C/2+Y+C/2+1) \text{ µm}$$

where Y is the width of the external trench (indicated with 505 in FIG. 5B) as defined in the etching mask. If X is the diameter of the central trench, the following relationships should hold:

$$X=(A+C+2) \text{ µm}$$

$$Y=(C+1) \text{ µm},$$

from which we derive that $$C=(B-2)/3 \text{ µm}.$$

For example, for a guidance channel having a difference in refractive index between channel core and channel cladding of 0.7% and channel cladding of annular width of 17 µm, X=(5+5+2) µm, Y=6 µm and C=5 µm. Therefore, the thickness of the planar silicon oxide thermally grown of the substrate surface and on the side walls of the trenches (layer 506 in FIG. 5B) can be set to 5 µm, to which the 1 µm thickness of the deposited layer filling the external trench (layer 510 in FIG. 5D) is to be added. In case of a single thermal oxidation process, e.g., according to the first embodiment of the invention, which is carried out at a temperature of 1200° C., oxidation time for growing 17 µM of $SiO_2$ for the channel cladding is about 16 days, whereas this time is reduced to about 1 day for the oxide growth of 17 µm for the channel cladding if carried out according to this example of the present embodiment.

Consequently, the present embodiment has the advantage of reducing the manufacturing time by reducing the time required to grow the $SiO_2$ layer that will define the channel cladding.

Fifth Embodiment

Figure 6:
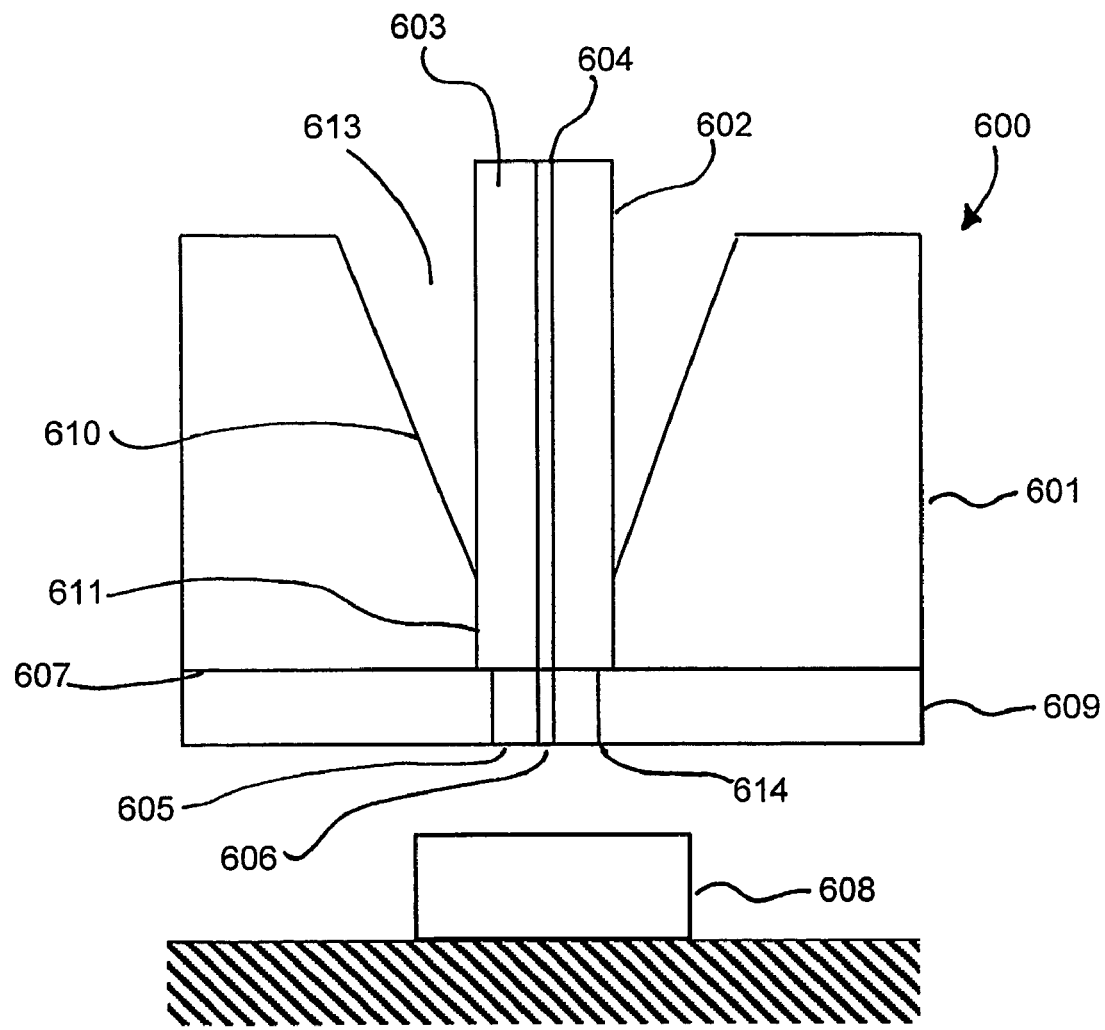
FIG. 6 illustrates a coupling structure according to a fifth embodiment of the invention for coupling an optical fibre to an optical fibre.

FIG. 6 illustrates a coupling structure according to a further embodiment of the present invention. According to the present embodiment, in a coupling structure 600, a guidance element 609 is attached to a fibre drive-in element 601, which facilitates insertion and accommodation of the optical fibre to the guidance element. The coupling structure 600 allows coupling of an optical fibre 602 to an optical device 608, such as a laser diode or a photodiode. In the present embodiment, guidance element 609 is of the type described in the first embodiment (FIG. 1) and comprises a guidance channel 614 with a channel cladding 605 and a channel core 606. It will be understood that other designs of the guidance element, such as those described in FIGS. 3 to 5, can be conceived to be part of the coupling structure 600. Drive-in element 601 comprises a c-Si substrate, which is through-etched to form a funnel-shaped via hole 613 having a tapered entry 610 and a cylindrical socket 611. Drive-in element 601 and guidance element 609 are positioned one above the other and aligned so that the centre of the socket area corresponds substantially to the centre of the guidance channel. Drive-in element and guidance element are preferably permanently bonded to each other along surface 607 so as to form a single coupling structure. Optical fibre 602, including a cladding 603 and a core 604, is to be inserted vertically into funnel 613 so that its end face is in physical contact with the guidance element 609. The optical fibre core 604 is then substantially aligned with the channel core 606, e.g., through butt coupling. Therefore, the guidance element functions also as a mechanical stopping layer for the optical fibre. Preferably, the fibre end is cleaved for the purpose of obtaining a fibre end which is flat, smooth and substantially perpendicular to the longitudinal fibre axis.

The coupling structure according to the present embodiment is particularly suitable for the optical coupling of an optical device with a detachably connected optical fibre. In a preferred embodiment the funnel entry has a quadratic cross-section of side of 800 to 850 µm, more preferably of about 830 µm at the entry surface; the tapered section 610 having gradually tapered peripheral walls has a height of 450-550 µm, preferably of about 500 µm; and fibre socket 611 has a diameter of 127±1 µm and a depth of 100-300 µm, preferably 150-200 µm. Preferably, guidance element 609 is 100-200 µm thick and has a guidance channel of diameter of 12-18 µm. The diameter of the guidance channel core should be of size comparable to that of the core of the fibre to be coupled. In case of standard SM fibres with fibre core of 9 µm, the channel core of the guidance element should be between 8 and 10 µm.

For detachably connected optical fibres, it is advantageous for the mechanical stability of the connection that the fibre terminal section in the funnel is slightly larger than the funnel depth of the drive-in element. The excess of fibre length causes a slight arching of the fibre when this comes into contact with the upper surface of the guidance element, thus generating a force that keeps the fibre pressed against such a surface.

However, also permanently connected optical fibres, e.g., attached into the funnel with optical-grade epoxy, fully benefit from the coupling structure including the guidance element of the present invention. Especially in case of permanent fibre connections, funnel design can be simplified in a fibre socket having vertical straight side walls and with diameter slightly larger than that of the optical fibre, e.g., 127±1 µm for standard silica fibres.

In case of permanently connected fibres, an angled cleavage of the fibre end can be also considered. The end surface of the fibre forms an angle to the direction of propagation of light in the optical fibre so as to reduce back-reflections into the optical device.

In FIG. 6, the optical device 608 is shown to be placed at a given distance from the backside surface of the coupling structure 600, e.g., on a base surface of a package. Alternatively, the optical device 608 can be mounted with the active side facing the backside surface of the guidance element, using solder bumped flip-chip technology (not shown). In case of flip-chip soldered optical devices the optical distance between the surface of the guidance element facing the optical device and the active surface of said optical device can be minimised.

Figure 7A:
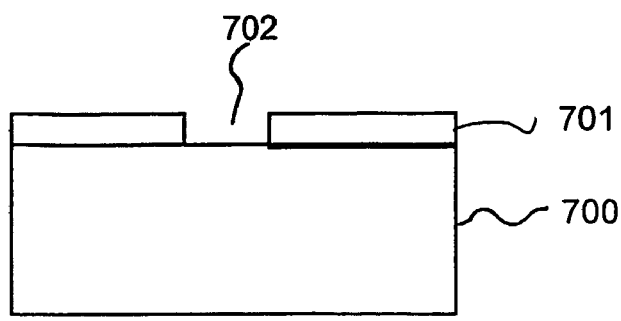
FIGS. 7A through 7N are cross-sectional views showing the process steps whereby the coupling structure of FIG. 6 is constructed.
Figure 7B:
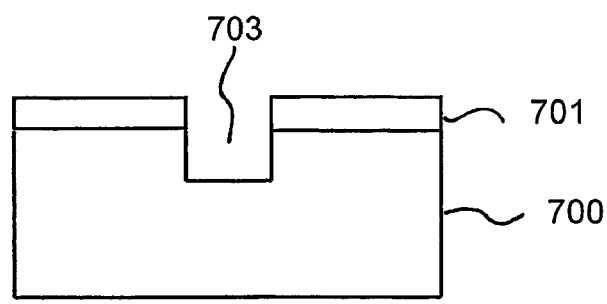
Figure 7C:
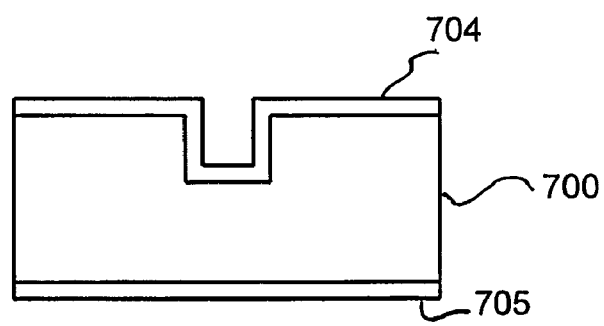
Figure 7D:
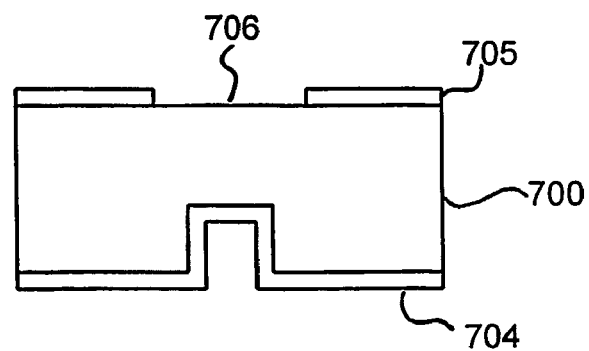
Figure 7E:
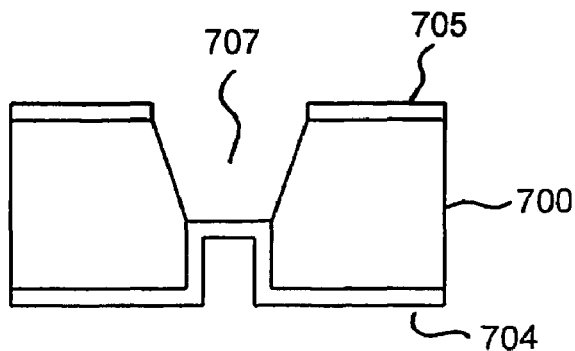
Figure 7F:
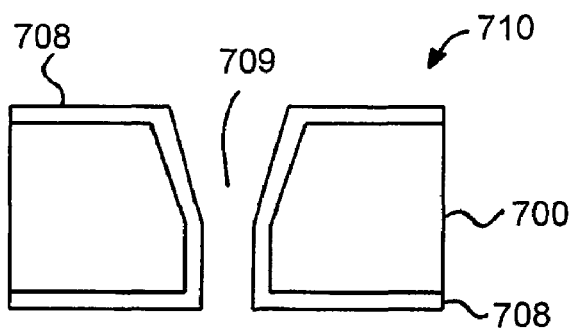
Figure 7G:
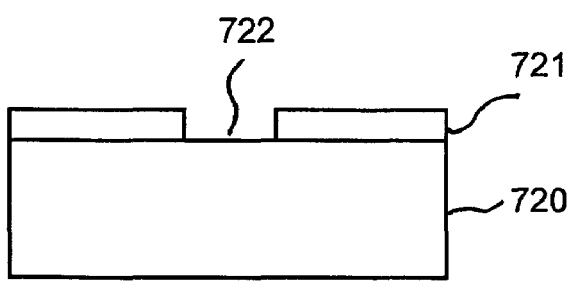
Figure 7H:
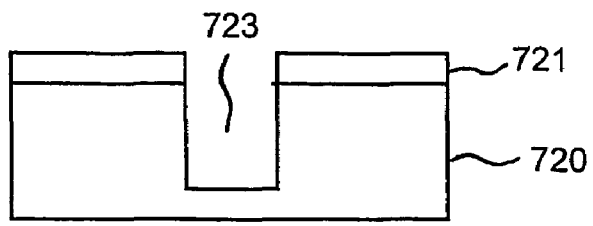
Figure 7I:
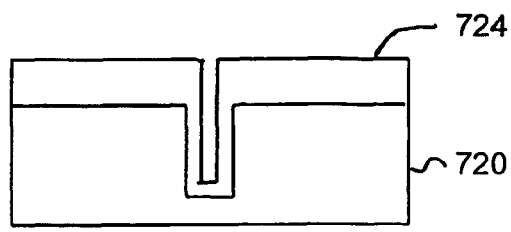
Figure 7J:
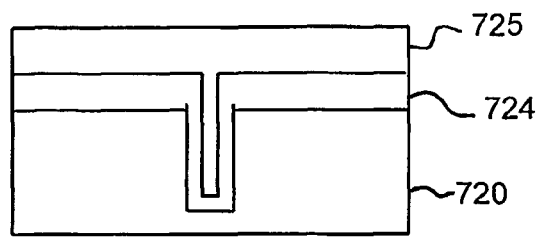
Figure 7K:
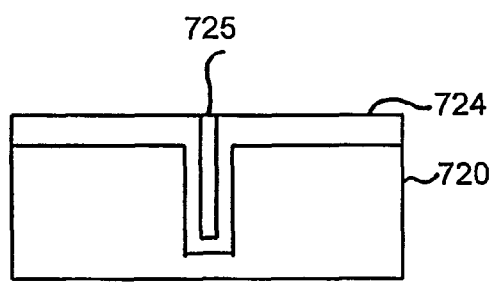
Figure 7L:
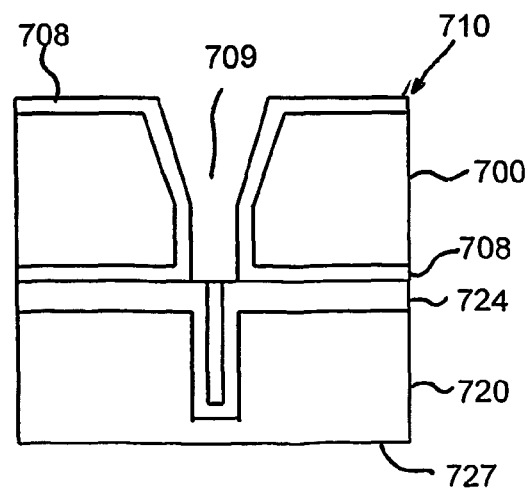
Figure 7M:
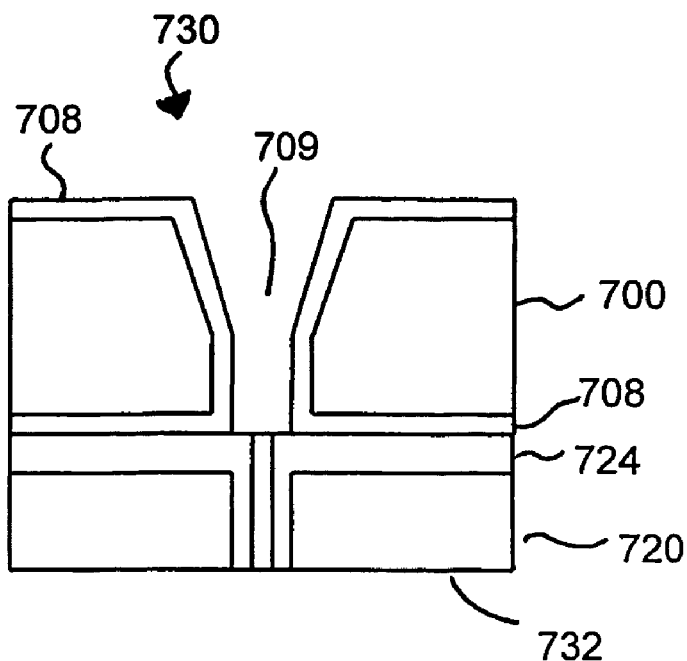
Figure 7N:
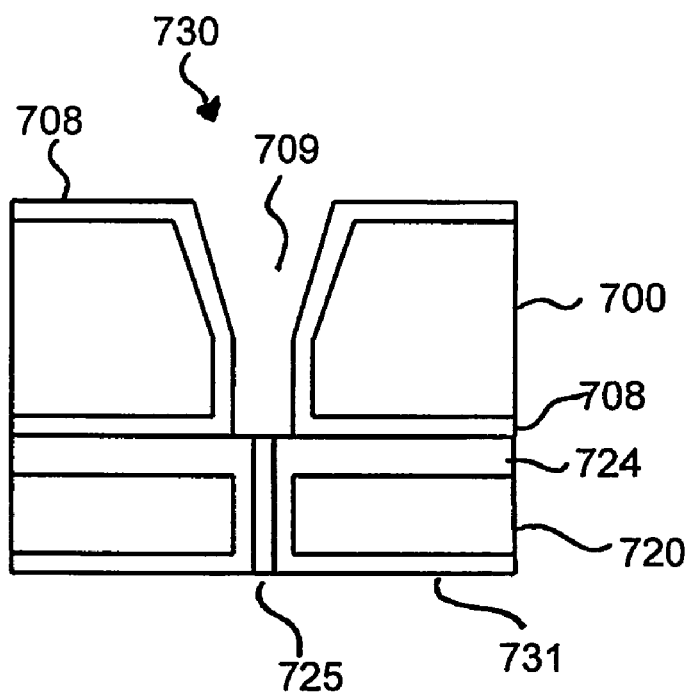

In the following, a fabrication process of the coupling structure of FIG. 6 will be described, which is illustrated in FIGS. 7A-7N. A mask oxide layer 701 composed of silicon oxide in grown on a first main surface of a first c-Si substrate 700 using conventional techniques, e.g., by thermal oxidation. For example, silicon substrate is a 675-μm thick 6" c-Si wafer and the thickness of the mask oxide is of about 1 μm. The mask oxide 701 is then patterned and etched using photolithographic techniques to define an opening 702 of circular cross-section (FIG. 7A). Subsequently, trench 703 is formed by dry etching, e.g., by plasma etching or by reactive ion etching, through the exposed area (opening) 702 of the first silicon surface (FIG. 7B). After removal of the oxide mask layer 701, the silicon substrate 700 is subject to a thermal oxidation in order to form a silicon dioxide layer on its both surfaces comprising the trench sidewalls, i.e., oxide layers 704 and 705 (FIG. 7C). Preferably, the thickness of the oxide layer 704 is not smaller than 1 μm and not larger than 2 μm. The resulting trench diameter is that of the fibre socket to be formed and thus suitable for insertion and accommodation of an optical fibre. In case of bare SM or MM fibres, trench diameter is preferably selected to be 1-2 μm larger than the fibre diameter, which is typically of about 125 μm. For a coated fibre, it is preferable that the trench diameter is 2-3 μm larger than the fibre diameter, which is typically of about 250 μm, due to the fluctuations of the coating diameter.

In a subsequent step, the first silicon substrate 700 is turned upside-down to place the first silicon surface comprising the trench at the backside. Silicon oxide layer 705 is patterned so as to define a quadratic cross-sectional opening 706 (FIG. 7D). Selective anisotropic etching forms a pyramidal hole 707 (FIG. 7E) that reaches the oxide layer 704. For example, a (100)-oriented c-Si substrate is chemically etched in TMAH:$H_2O$ 9% solution to form slanted sidewalls having an angle of 54.77° between the (100) and (111) c-Si planes. In a next step, the oxide layers are removed from the Si surfaces and from the trench to define funnel-shaped through-hole. Silicon oxide layer 708 is then thermally grown on the Si surfaces, thereby resulting in the fibre drive-in element 710 having funnel-shaped through hole 709, as shown in FIG. 7F.

A second silicon substrate 720 is provided to form the guidance element, for example, a (100)-oriented 6" 675 μm-thick c-Si wafer. A patterned oxide layer 721 defining a circular opening 722 is formed on the second substrate 720 (FIG. 7G). The silicon is etched, e.g., by dry etching, through the opening 722 in order to form a trench 723 (FIG. 7H). The oxide layer 721 is removed, e.g., by standard dipped chemical etching, and a relatively thick $SiO_2$ layer 724 is grown on the substrate surface (FIG. 7I). For a given initial trench diameter, the thickness of the $SiO_2$ layer 724 in the trench defines the thickness of the channel cladding to be formed (denoted with 605 in FIG. 6). In a subsequent step, the trench is filled through depositing a $SiO_2$ layer 725 over the upper surface of substrate 720 (FIG. 7J). $SiO_2$ layer 725 has a refractive index $n_2$ larger than the refractive index $n_1$ of the $SiO_2$ layer 724. Planarisation through CMP is carried out to remove the silicon dioxide layer 724 except from the trench and to polish the surface to an optical smooth finish (FIG. 7K).

The two substrates are then aligned by precision alignment procedures and joined permanently together at the surface of the oxide layers by direct wafer bonding (FIG. 7L). Preferably, the two substrates are aligned by means of standard wafer alignment tools, which are capable of alignment tolerances of ±1 μm. They can be joined by thermo-compression bonding, in which the two substrates are clamped together with considerable pressure and then annealed for several hours at 1200° C. Alternatively, anodic bonding can be used to join the two substrates of the coupling structure.

Finally, backside surface 727 of substrate 720 of the guidance element is grinded back to reduce its thickness and to expose the guidance channel, as shown in FIG. 7M. Grinding can be carried out by grinder tools followed by a CMP for optical smooth finish. Alternatively, exposure of the guidance channel can be performed by CMP so that planarisation and polishing of the back surface 727 is obtained simultaneously to the grinding. Optionally, an oxide layer 731 of not less than about 1 μm could be formed on the polished surface 732 for electrical isolation or to guarantee a glass-compatible finished surface (FIG. 7N).

Although in the preferred embodiment the drive-in element includes a semiconductor substrate, not necessarily although more preferably silicon, other materials can be envisaged as long as via holes suitable for the insertion of optical fibres can be manufactured with precision and reproducibility in the substrate.

Sixth Embodiment

Figure 8A:
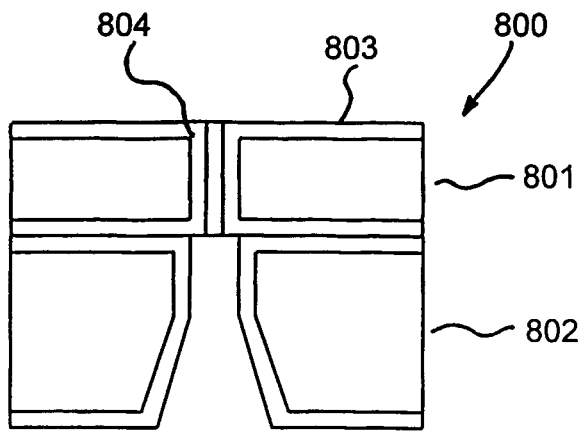
FIGS. 8A through 8D are cross-sectional views showing the process steps to manufacture a coupling structure according to a sixth embodiment of the invention.
Figure 8B:
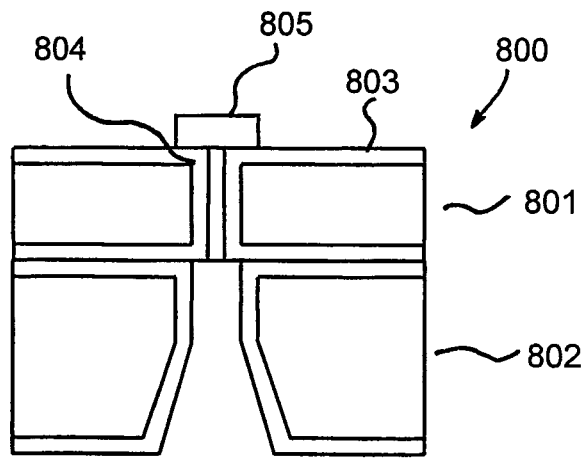
Figure 8C:
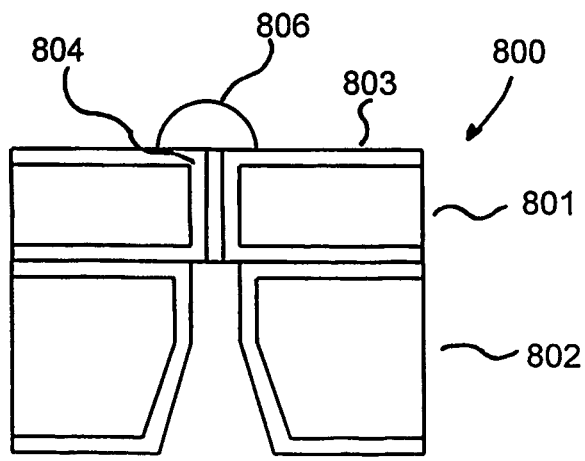
Figure 8D:
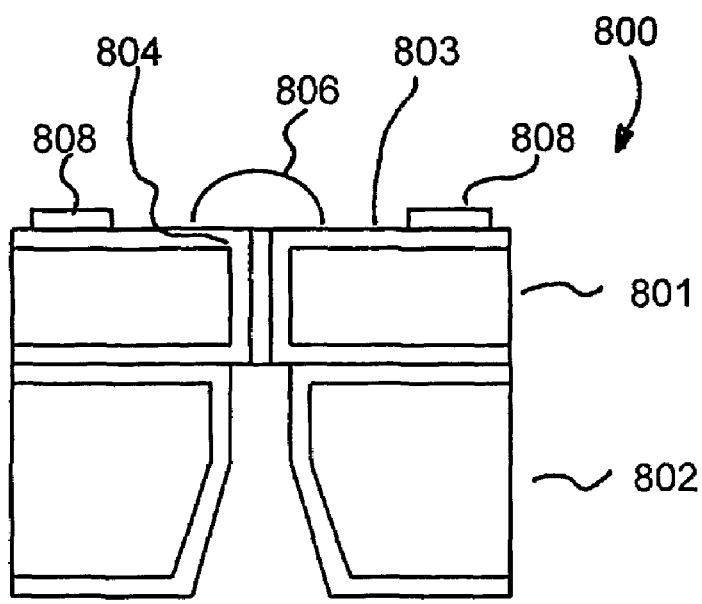

According to another embodiment of the present invention, a coupling structure including a monolithically integrated microlens is shown in FIGS. 8A through 8D. Coupling structure 800, shown in FIG. 8A turned upside-down, includes guidance element 801 with a guidance channel 804 and fibre drive-in element 802. Structure 800 can be made by the process described in FIGS. 7A through 7M or 7N, i.e., with or without the $SiO_2$ layer grown on the back surface 803 of the coupling structure. A $SiO_2$-based layer 805 is deposited on the structure backside surface 803 (FIG. 8B). For example, 5 μm-thick silicon oxide doped with boron and phosphorous (BPSG), with B 5% wt and P 3% wt, is deposited. The refractive index of the BPSG layer is substantially equal to that of the channel core, whereas its melting temperature is much lower than that of the $SiO_2$ layers forming the guidance channel. Layer 805 is masked and etched to define a raised circular step at a location and width which approximately corresponds to those of guidance channel 804. The coupling structure is then heated to allow the raised step to partially melt and re-solidify forming an approximately hemispherical lens 806 (FIG. 8C). For example, a patterned raised step of 15 μm diameter is heated for 1 min at 900° C. Optionally, metallic bond pads or solder bumps 808 can be formed on the coupling structure back surface 803 (FIG. 8D) for flip-chip attachment of the optical device.

Although silica-based microlenses are particularly advantageous because of their relatively simple production process and integration to the coupling structure, manufacture of polymeric lenses, for instance by injection printing, could be envisaged. Silica-based or polymeric microlens is preferably integrated to the coupling structure. However, microlens also made by other materials can be attached to the back surface of the coupling structure by means of an adhesive, for example a UV-curable adhesive having a refractive index approximately equal to that of the microlens.

Figure 9:
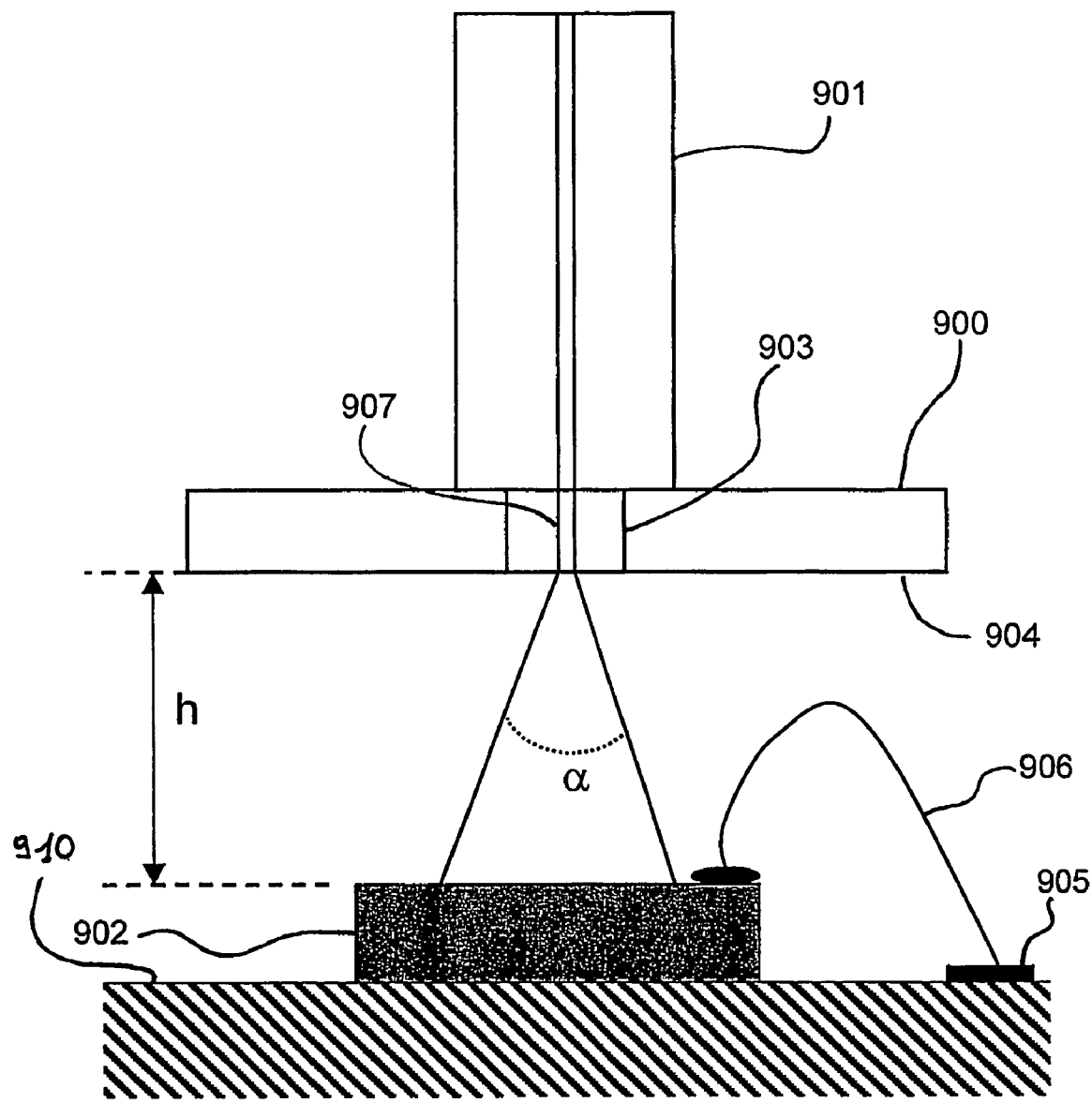
FIG. 9 schematically illustrates the optical coupling of an optical fibre to an optical device through a coupling structure of the invention.

Besides being affected by the accuracy of the alignment between the fibre and the optical device, coupling efficiency depends on the distance between the optical source (or receiver) and the fibre. FIG. 9 illustrates the coupling of an optical fibre 901 to an optical device 902 (in this example an optical receiver) through coupling structure 900 comprising guidance channel 903. The optical device is placed on surface 910, e.g., on a package base surface, with its active surface at a longitudinal distance h from the guidance element 900. The light leaving the fibre is coupled to the channel core 907 of the guidance channel 903 and guided through it. The light emerging from surface 904 of the guidance element radiates through a cone of diverging light as shown. The angle α of the light cone is related to the numerical aperture (NA) of the fibre. In standard telecommunication SM fibres angle α is typically 11-12°. The cross-sectional area of the light incident upon the optical device surface depends of course on both angle α and on distance h. Therefore, an increase of the distance h may come at the cost of reducing the optical power incident upon the active region of the optical device. On the other hand, a minimum longitudinal distance is generally required in case the optical device is housed in a package and is electrically connected by conventional techniques, such as by wire bonding. The minimum space occupied by the bonding wires dictates the minimum distance between the optical device and the guidance element (coupling structure). For conventional wire bonding, the optical device needs to be placed at a longitudinal distance of at least 50-70 μm from other elements, e.g., a package lid. In the example shown in FIG. 9 bonding wire 906 connects electrically optical device 902 to bonding pad 905 on the package base surface. The coupling structure according to the present invention decreases the length between the optical fibre and the optical device, in which the light is unguided, thereby improving the efficiency of optical coupling.

Seventh Embodiment

Figure 10:
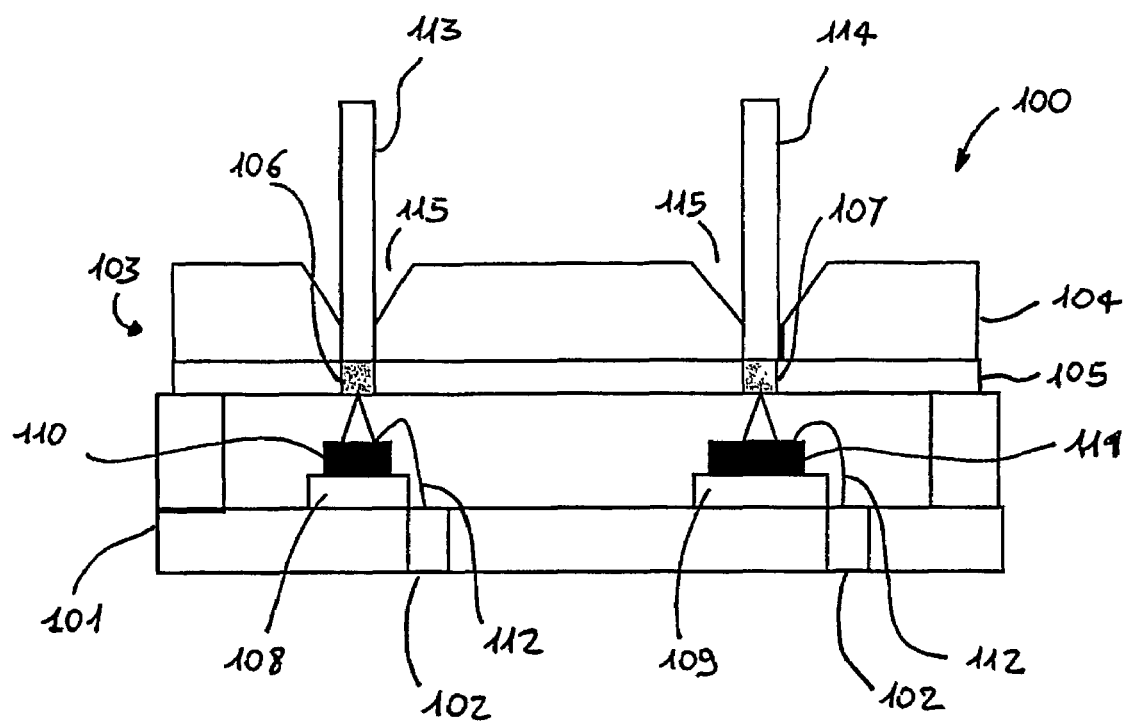
FIG. 10 illustrates a cross-sectional view of a bi-directional optical transmission and reception subassembly according to a further embodiment of the invention.

FIG. 10 shows a cross-sectional view of a bi-directional optical transmission and reception subassembly 100 according to an embodiment of the present invention. Package 101, for example a leadless chip carrier (LCC) package, houses an optical transmitter 110, e.g., a laser diode, and an optical receiver 111, e.g., a photodiode. Optical transmitter 110 and receiver 111 are attached to submounts 108 and 109, respectively, which are in turn attached to the package base. Fixing the optical devices 110 and 111 to their submounts can be carried out by eutectic die attach process or by gluing with epoxy. Flip-chip bonding techniques can be also used to fix the optical devices to the submounts. Electric wires or ribbons 112 electrically connect metallised pads (not shown) of optical devices 110 and 111 to bonding fingers or pads 102 in the package base.

Coupling structure 103 comprises a fibre drive-in element 104 with two funnels 115 and a guidance element 105 having guidance channels 106 and 107 located in correspondence with the funnels. Coupling structure 103 is positioned to close the package housing and to optically align the funnels with the optical devices in the package. Therefore, according to the present embodiment, the coupling structure functions also as a cover, e.g., lid, for the package. In the example shown in FIG. 10 coupling structure 103 closes completely and, if necessary, hermetically the package. Positioning of the coupling structure 103 with respect to package 101 is carried out by flip-chip. Fiducial markers can be provided on the optical devices for precise alignment with the coupling structure using automated pick and place machines. Optical fibre terminating portions 113 and 114, which are inserted into funnels 115, are passively aligned with transmitter 110 and receiver 111, respectively. Optical fibre end faces are butt-coupled to the optical surface of the guidance element. In a preferred embodiment, optical fibres 113 and 114 are bare, i.e., uncoated, SM fibres, receiver 111 is a surface illuminated photodiode, and optical transmitter 110 is a long-wavelength VCSEL (LW-VCSEL) in either 1310 nm or 1550 nm. In a more preferred embodiment, guidance channels 106 and 107 are of the type "step index", according to the first embodiment of the invention illustrated in FIG. 1.

In another preferred embodiment, fibres 113 and 114 are MM fibres, optical transmitter 110 is an 850 nm VCSEL and receiver 111 is a surface illuminated photodiode. In case of optical coupling MM fibre, guidance channels 106 and 107 are of type step-index and comprise a channel core of 50±3 μm of diameter.

Fibre terminating portions can be housed in a plug-in optical connector for removably connecting the optical fibres to an optical subassembly through a coupling structure according to the present invention.

In case of angled terminating fibres, i.e., for permanently connected fibres, the terminating section of the fibre can pass through a standard APC (angled physical contact) connector.

The bi-directional optical sub-assembly described in the present embodiment is particularly suitable for FTTX access networks. It should be understood however that the invention is not limited to the use of any particular type of optical subassembly, but it is instead more generally applicable to any device in which it is desirable to simplify and increase of efficiency the coupling between an optical fibre and an optical device. For example, the invention is suitable for use with individually-packaged optical transmitters or receivers.

The invention claimed is:

1. A coupling structure for optical coupling between an optical fibre and an optical device comprising:
    a first substrate having a front main surface;
    at least a guidance channel which extends through said first substrate from the front main surface to an opposite rear main surface, said guidance channel being configured so as to optically confine the light propagating therethrough; and
    a second substrate in which a via hole for insertion of the optical fibre is formed such that the via hole goes through said second substrate from a front main surface to an opposite rear main surface of said second substrate, said second substrate being placed on the first substrate with its opposite rear main surface adjacent to the first main surface of the first substrate so that the via hole of the second substrate is substantially in alignment with the guidance channel of the first substrate.

2. The coupling structure of claim 1, wherein the guidance channel comprises an internal optically transparent region having a first refractive index and defining a guide channel core and an external optically transparent region surrounding the internal optically transparent region and defining a guide channel cladding, the external optically transparent region having a second refractive index smaller than the first refractive index of the internal optically transparent region.

3. The coupling structure of claim 1, wherein the first substrate comprises a semiconductor material.

4. The coupling structure of claim 3, wherein the first substrate comprises monocrystalline silicon.

5. The coupling structure of claim 2, wherein the internal and external optically transparent regions of the guidance channel comprise substantially silicon oxide.

6. The coupling structure of claim 2, wherein the first refractive index and the second refractive index have a difference in the range of 0.5-0.8%.

7. The coupling structure of claim 5, wherein the internal optically transparent region of the guidance channel defining the guide channel core comprises substantially phosphorous-doped silicon oxide and the external optically transparent region of the guidance channel defining the guidance channel cladding comprises substantially undoped silicon oxide.

8. The coupling structure of claim 2, wherein the internal optically transparent region has a substantially circular cross-section of diameter between 8 and 10 μm.

9. The coupling structure of claim 8, wherein the external silicon oxide region has a substantially annular cross-section of width between 10 and 30 μm.

10. The coupling structure of claim 9, wherein the external silicon oxide region has a substantially annular cross-section of width between 12 and 18 µm.

11. The coupling structure of claim 2, wherein an internal silicon oxide region of the guidance channel has sloped sidewalls and a refractive index which is graded in the guidance channel.

12. The coupling structure of claim 2, wherein the guidance channel further comprises a first intermediate optically transparent region surrounding the internal silicon optically transparent region and having a given refractive index and a second intermediate optically transparent region surrounding the first intermediate region and being surrounded by the external optically transparent region, the second intermediate optically transparent region having a given refractive index, the refractive index of the first intermediate region being smaller than the refractive index of the internal optically transparent region.

13. The coupling structure of claim 12, wherein the internal, the first intermediate, the second intermediate and the external optically transparent regions comprise substantially silicon oxide.

14. The coupling structure of claim 13, wherein the refractive index of the second intermediate silicon oxide region is substantially equal to that of the internal silicon oxide region.

15. The coupling structure of claim 13, wherein the refractive index of the first intermediate region is substantially equal to that of the external oxide region.

16. The coupling structure of claim 1, wherein the via hole of the second substrate has a substantially circular section of diameter within the range 126-128 µm.

17. The coupling structure of claim 1, wherein the via hole of the second substrate has a substantially circular cross-section of diameter of 254-258 µm.

18. The coupling structure of claim 1, wherein an opening size of the via hole at the upper main surface of the second substrate is larger than the opening size of the via hole at the opposite rear main surface of the second substrate.

19. The coupling structure of claim 18, wherein the via hole has a first section extending downward from the front main surface to a given depth, said first section having inwardly tapered side walls, and a second section contiguous to the first section and extending downward to the opposite rear main surface, said second section having substantially vertical side walls, such as to define a funnel-shaped via hole.

20. The coupling structure of claim 19, wherein the opening size at the main surface of the second substrate is between 800 and 850 µm.

21. The coupling structure of claim 19, wherein the opening size at the opposite main surface of the second substrate has a diameter of 126-128 µm.

22. The coupling structure of claim 19, wherein the first section of the via hole having inwardly tapered side walls extends to a distance of 450-550 µm in the direction substantially perpendicular to the upper main surface of the second substrate.

23. The coupling structure of claim 1, wherein the second section of the via hole having vertical walls extends to a distance from 100 to 300 µm in the direction substantially perpendicular to the upper main surface of the second substrate.

24. The coupling structure of claim 1, wherein the second substrate for insertion of the optical fibre comprises a semiconductor material.

25. The coupling structure of claim 24, wherein the semiconductor material of the second substrate is monocrystalline silicon.

26. A method for producing a semiconductor coupling structure comprising the successive steps of:
providing a first silicon substrate having opposite front and rear surfaces;
etching to form a substantially vertical trench from the front surface in the first semiconductor substrate;
forming a first layer of silicon oxide material on the inner walls of the trench and on the upper surface of said substrate near said trench, said first silicon oxide layer having a first refractive index;
forming a second layer of silicon oxide material over said first layer so as to fill the trench, said second silicon oxide layer having a second refractive index larger than the first refractive index of the first silicon oxide layer;
planarising the second silicon oxide layer to expose the first silicon oxide layer in the trench and to form a planar surface; and
back etching said first silicon substrate from the rear surface to expose the first and the second silicon oxide layers.

27. The method of claim 26, wherein the etching to form said trench in the silicon substrate is performed by reactive ion etching.

28. The method of claim 26, wherein the forming of the first layer of silicon oxide is accomplished by thermal oxidation.

29. The method of claim 26, wherein the forming of the second layer of silicon oxide is performed by low-pressure chemical vapour deposition.

30. The method of claim 26, wherein the back etching of the first silicon substrate is performed by grinding.

31. The method of claim 26, wherein the back etching of the first silicon substrate is performed by chemical mechanical polishing.

32. The method of claim 26, wherein the step of back etching of the first silicon substrate includes grinding and polishing the rear surface in which a step of chemical mechanical polishing follows the step of grinding.

33. The method of claim 26, further comprising the steps of:
providing a second silicon substrate having opposite front and rear surfaces;
etching a first substantially vertical trench from the front surface to a first depth;
forming a first layer of silicon oxide material on the inner walls of the trench and on the front surface of said second substrate;
etching a second trench with tapered side walls from the rear surface of the second substrate to the depth so that the bottom of the second trench is in contact with the first layer of silicon oxide material in the inner walls of the first trench;
removing the silicon oxide layer from the bottom of the second trench and the inner walls of the first trench to form a funnel-shaped via hole extending from the front surface to the rear surface of the second substrate;
disposing the front surface of the second silicon substrate against the main surface of the first silicon substrate such that the funnel-shaped via hole of the second substrate is substantially in alignment with the guidance channel of the first substrate; and
bonding said substrates together.

34. The method of claim 33, wherein the step of bonding includes the step of fusion bonding the substrates.

35. The method of claim 33, in which the second silicon substrate is made of monocrystalline silicon.

36. The method of claim 26, in which the first silicon substrate is made of monocrystalline silicon.

37. An optical package comprising:
a housing having a cavity and an aperture;
at least an optical device fixed in the cavity of the housing and optically aligned with the aperture;
a coupling structure for coupling of an optical fibre to the optical device, which is capable of dosing the aperture of the housing, wherein said coupling structure comprises:
a first substrate having a front main surface;
at least a guidance channel which extends through said first substrate from the front main surface to an opposite rear main surface, wherein said guidance channel is configured so as to confine the light propagating therethrough; and
a second substrate in which a via hole for insertion of the optical fibre is formed such that the via hole goes through said second substrate from a front main surface to an opposite rear main surface of said second substrate, said second substrate being placed on the first substrate with its opposite rear main surface adjacent to the first main surface of the first substrate so that the via hole of the second substrate is substantially in alignment with the guidance channel of the first substrate.

38. The package of claim 37, wherein said guidance channel comprises an internal optically transparent region having a first refractive index and defining a guide channel core and an external optically transparent region surrounding the internal optically transparent region and defining a guide channel cladding, the external optically transparent region having a second refractive index smaller than the first refractive index of the internal optically transparent region.

39. The package of claim 37, including two optical devices, one being an optical transmitter and one being an optical receiver.

40. The package of claim 39, wherein the optical transmitter is a laser diode.

41. The package of claim 39, wherein the optical receiver is a photodiode.

42. The package of claim 37, in which the via hole of the second substrate of the coupling structure has a funnel shape with a first section extending downward from the front main surface to a given depth, said first section having inwardly tapered side walls, and a second section contiguous to the first section and extending downward to the opposite rear main surface, said second section having substantially vertical side walls.

* * * * *